(12) United States Patent
Minakata et al.

(10) Patent No.: US 7,978,235 B2
(45) Date of Patent: Jul. 12, 2011

(54) ELECTRONIC ZOOMING DEVICE

(75) Inventors: Nobuyuki Minakata, Osaka (JP);
Toshinobu Hatano, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/939,704

(22) Filed: Nov. 4, 2010

(65) Prior Publication Data

US 2011/0050962 A1 Mar. 3, 2011

Related U.S. Application Data

(62) Division of application No. 11/808,957, filed on Jun. 14, 2007, now Pat. No. 7,852,382.

(30) Foreign Application Priority Data

Jun. 14, 2006 (JP) .................................. 2006-164789

(51) Int. Cl.
  *H04N 5/262* (2006.01)
  *H04N 9/64* (2006.01)
  *H04N 9/74* (2006.01)
  *G06K 9/32* (2006.01)
  *G06K 9/40* (2006.01)
(52) U.S. Cl. ................ 348/240.2; 348/240.99; 348/248; 348/581; 382/298; 382/260

(58) Field of Classification Search ............... 348/240.2, 348/240.99, 14–714; 382/298, 260, 274, 382/300, 299
See application file for complete search history.

(56) References Cited

U.S. PATENT DOCUMENTS 7,333,141 B2 *  2/2008 Hung .......................... 348/240.2
7,471,320 B2 * 12/2008 Malkin et al. ................. 348/252
2006/0204125 A1  9/2006 Kempf et al.

FOREIGN PATENT DOCUMENTS

JP  2000-134524  5/2000

* cited by examiner

*Primary Examiner* — Lin Ye
*Assistant Examiner* — Marly Camargo
(74) *Attorney, Agent, or Firm* — McDermott Will & Emery LLP

(57) ABSTRACT

A vertical zooming unit vertically resizes image data by a tap number m. A horizontal zooming unit horizontally resizes the vertically-resized image data outputted from the vertical zooming unit by a tap number n. A tap coefficient setting unit arbitrarily sets respective tap coefficients when the vertical zooming unit or the horizontal zooming unit is operated. A memory stores the image data therein. A memory controller controls input and output of the image data among the memory, the vertical zooming unit and the horizontal zooming unit.

2 Claims, 5 Drawing Sheets

ELECTRONIC ZOOMING DEVICE

RELATED APPLICATIONS

This application is a Divisional of U.S. patent application Ser. No. 11/808,957 now U.S. Pat. No. 7,852,382, filed on Jun. 14, 2007, claiming priority of Japanese Patent Application No. 2006-164789, filed on Jun. 14, 2006, the entire contents of each of which are hereby incorporated by reference.

BACKGROUND OF THE INVENTION

1. Field of the Invention

The present invention relates to an electronic zooming device for vertically or horizontally resizing (change of image size), for example, two-dimensional image data obtained by image-processing a video signal outputted from an image sensor developed for a digital camera depending on how the image data is used.

2. Description of the Related Art

In recent years, there has been a remarkable progress in the transition from the analog technology to the digital technology in the camera industry. A digital still camera, in particular, for which neither a film nor a developing process is necessary, is selling well in the market. Further, mobile telephones in the mainstream are now provided with a built-in camera, and not only an optical zooming device but also an electronic zooming device is installed therein to process a digital signal. In a digital still camera, resizing of an obtained image or a reproduce image is functionally useful as a means for adjusting an image size in accordance with a display device, and as a band-limited image transmitter.

So far were proposed, as the digital still camera, an electronic zooming device for scale-down resizing which allows a data size of an obtained image file to be reduced and makes it easier to handle the image size, and an electronic zooming device for scale-up resizing which enables the details of the obtained image to be checked on a liquid crystal monitor (for example, see Japanese Patent Laid-Open Publication No. 2000-134524).

FIG. 5 shows a conventional electronic zooming device. Referring to reference numerals shown in the drawing, 501 denotes a solid-state image sensing device for photoelectrically converting an optical image of a photographic subject and outputting charge information, 502 denotes a CDS/AGC circuit for retrieving a charge signal obtained from the solid-state image sensing device 501 as an analog signal, 503 denotes an A/D converter for converting the analog signal obtained in the CDS/AGC circuit 502 into digital video data, 504 denotes a pre-processor for executing the black-level correction, gamma correction, gain correction, and the like, to the A/D-converted image signal data, 505 denotes a YC input unit for inputting a digital YC signal from outside, 506 denotes a medium input unit for receiving the image data inputted from an external medium input unit, 507 denotes a SDRAM in which the respective image data is stored, 508 denotes an image processor for converting the pre-processed data into YC data, 509 denotes a vertical zooming unit for vertically resizing the inputted image data by a tap number m, 510 denotes a horizontal zooming unit for horizontally resizing the vertically resized image data obtained in the vertical zooming unit 509 by a tap number n, and 511 denotes a memory controller for controlling the input and output of the data between (the pre-processor 504, SDRAM 507, YC input unit 505, medium input unit 506 and image processor 508) and (vertical zooming unit 509 and horizontal zooming unit 510). The tap number mentioned above denotes the number of digital filter coefficients.

In the electronic zooming device, the memory controller 511 inputs the image data to be resized to the vertical zooming unit 509. The vertical zooming unit 509 vertically resizes the image data using a fixed coefficient of the tap number m in accordance with a vertical resizing magnification, and inputs one horizontal data which was vertically resized to the horizontal zooming unit 510. The horizontal zooming unit 510 horizontally resizes the inputted data using a fixed coefficient of the tap number n in accordance with a horizontal resizing magnification. As a result, the data which was horizontally and vertically resized can be obtained.

However, the foregoing conventional electronic zooming device was provided with only such a single function of resizing image data by means of a fixed tap coefficient predetermined in accordance with the magnification.

SUMMARY OF THE INVENTION

Therefore, a main object of the present invention is to realize, in an electronic zooming device, processing functions other than such a single function as resizing of image data, for example, data computing functions such as contour emphasizing and color correction, and other functions.

In order to resolve the foregoing problem, an electronic zooming device according to the present invention comprises:

a vertical zooming unit for vertically resizing image data by a tap number m;

a horizontal zooming unit for horizontally resizing the vertically-resized image data outputted from the vertical zooming unit by a tap number n;

a tap coefficient setting unit for arbitrarily setting respective tap coefficients when the vertical zooming unit or the horizontal zooming unit is operated;

a memory in which the image data is stored; and a memory controller for controlling input and output of the image data among the memory, the vertical zooming unit and the horizontal zooming unit.

As a preferable mode of the foregoing constitution, the electronic zooming device further comprises an image processor for correcting the image data when the vertical zooming unit or the horizontal zooming unit is operated. Accordingly, an image quality adjusting function can be realized.

As another preferable mode of the foregoing constitution, the electronic zooming device further comprises a gamma characteristic setting unit for adjusting a sensitivity of the image data when the vertical zooming unit or the horizontal zooming unit is operated. Accordingly, a high sensitivity processing, and the like, for improving the sensitivity of low luminance data can be realized.

As still another preferable mode of the foregoing constitution, the electronic zooming device further comprises a tap coefficient setting unit for arbitrarily setting the respective tap coefficients in accordance with a size to be resized when the vertical zooming unit or the horizontal zooming unit is operated. Accordingly, such a function that allows a user to execute the electronic zooming processing using any arbitrary filter characteristic can be realized.

As still another preferable mode of the electronic zooming device according to the present invention, the image data is RGB Bayer-array data, and the vertical zooming unit and the horizontal zooming unit scale-down resize the image data in a state where:

a filter tap number is $(4n+1)$;

a size of scale-down resizing is 1/(2n+1);

only an odd-numbered coefficient of the respective tap coefficients from an end thereof is set to a real number; and an even-numbered coefficient of the respective tap coefficients from the end thereof is set to zero, so that the scale-down resized image data is generated while the RGB Bayer array of the image data is maintained.

As still another preferable mode of the electronic zooming device according to the present invention, the tap coefficient setting unit sets such a tap coefficient that executes an arbitrary two-dimensional filtering process to the image data without resizing the image data as the tap coefficient.

As still another preferable mode of the electronic zooming device according to the present invention, the tap coefficient setting unit sets such a tap coefficient that detects information of the image data in one screen area without resizing the image data and can thereby execute an arbitrary two-dimensional filtering process independently for each of pixels as the tap coefficient.

As still another preferable mode of the electronic zooming device according to the present invention, an image quality is adjusted in the horizontal zooming unit. In this constitution, it is more preferable that a color gain setting unit capable of arbitrarily setting a color gain be provided in the horizontal zooming unit so that the user arbitrarily adjusts the image quality.

As still another preferable mode of the electronic zooming device according to the present invention, the horizontal zooming unit further comprises:

an image quality adjustment computing section for adjusting the image quality; and an image quality adjustment parameter setting section for setting an image quality adjustment parameter in the image quality adjustment computing section.

As still another preferable mode of the electronic zooming device according to the present invention, the gamma characteristic setting unit, when executing the gamma characteristic correction for improving the sensitivity of the image data having a low luminance, executes the gamma characteristic correction by inputting the image data carried as a result of addition made by an n-tap filter at the same time as one-fold resizing or scale-down resizing.

An imaging device preferably comprises:

an imaging unit for generating image data through imaging processing; and the electronic zooming device according to the present invention supplied with the image data generated by the imaging unit. Accordingly, functions of setting any arbitrary tap coefficient, correcting the image data, or correcting the gamma characteristic can be realized.

The horizontal zooming unit may be preferably provided with a color-difference matrix gain setting section capable of arbitrarily setting a color-difference matrix gain, wherein the user can arbitrarily adjust the image quality.

The horizontal zooming unit may be preferably provided with a WB gain setting section capable of arbitrarily setting a white-balance (WB) gain, wherein the user can arbitrarily adjust the image quality.

The horizontal zooming unit may be preferably provided with a luminance offset setting section capable of arbitrarily setting a luminance offset value, wherein the user can arbitrarily adjust the image quality.

The electronic zooming device according to the present invention can preferably set a plurality of filter characteristics in the tap coefficient setting unit for each frame processing by executing a plurality of operations by the memory controller to the same image data in the resizing process. Accordingly, such a bracket processing that adjusts the image quality of the same image data in various manners can be realized.

When the image data is resized, it is preferable that a plurality of operations by the memory controller is executed to a plurality of image data so that a plurality of filter characteristics can be set by the tap coefficient setting unit in each frame processing. Accordingly, the various image quality adjustments can be separately implemented to the plurality of image data.

When the image data is resized, the color gain of the horizontal zooming unit is preferably arbitrarily set in the same image data in each frame processing. Accordingly, the bracket processing which executes the various image quality adjustments to the same image data can be realized.

When the image data is resized, it is preferable that a plurality of operations by the memory controller is executed to a plurality of image data so that the color gain of the horizontal zooming unit is arbitrarily set in each frame processing. Accordingly, the various image quality adjustments can be separately implemented to the plurality of image data.

When the image data is resized, It is preferable that a plurality of operations by the memory controller is executed to a plurality of image data so that the color-difference matrix gain of the horizontal zooming unit is arbitrarily set in the same image data in each frame processing. Accordingly, the bracket processing which executes the various image quality adjustments to the same image data can be realized.

When the image data is resized, it is preferable that a plurality of operations by the memory controller is executed to a plurality of image data so that the color-difference matrix gain of the horizontal zooming unit is arbitrarily set in each frame processing. Accordingly, the various image quality adjustments can be separately implemented to the plurality of image data.

When the image data is resized, it is preferable that a plurality of operations by the memory controller is executed to the same inputted data so that the WB gain of the horizontal zooming unit is arbitrarily set in each frame processing. Accordingly, the bracket processing which executes the various image quality adjustments to the same inputted data can be realized.

When the image data is resized, it is preferable that a plurality of operations by the memory controller is executed to a plurality of inputted data so that the WB gain of the horizontal zooming unit is arbitrarily set in each frame processing. Accordingly, the various image quality adjustments can be separately implemented to the plurality of inputted data.

When the image data is resized, it is preferable that a plurality of operations by the memory controller is executed to the same inputted data so that the luminance offset value of the horizontal zooming unit is arbitrarily set in each frame processing. Accordingly, the bracket processing which executes the various image quality adjustments to the same inputted data can be realized.

When the image data is resized, it is preferable that a plurality of operations by the memory controller is executed to a plurality of inputted data so that the luminance offset value of the horizontal zooming unit is arbitrarily set in each frame processing. Accordingly, the various image quality adjustments can be separately implemented to the plurality of inputted data.

When the image data is resized, it is preferable that a plurality of operations by the memory controller is executed to the same inputted data so that the gamma characteristic correction for improving the sensitivity of the low luminance data is arbitrarily set in the vertical zooming unit or the horizontal zooming unit in each frame processing. Accordingly, the bracket processing which executes the various image quality adjustments to the same inputted data can be realized.

When the image data is resized, it is preferable a plurality of operations by the memory controller is executed to a plurality of inputted data so that the gamma characteristic correction for improving the sensitivity of the low luminance data is arbitrarily set in the vertical zooming unit or the horizontal zooming unit in each frame processing. Accordingly, the various image quality adjustments can be separately implemented to the plurality of inputted data.

According to the present invention, the user arbitrarily sets the tap coefficient of the electronic zooming in the electronic zooming device so that any desirable filter characteristic can be provided to an original image without increasing a circuit size.

BRIEF DESCRIPTION OF THE DRAWINGS

These and other objects as well as advantages of the invention will become clear by the following description of preferred embodiments of the invention. A number of benefits not recited in this specification will come to the attention of the skilled in the art upon the implementation of the present invention.

DETAILED DESCRIPTION OF THE INVENTION

Figure 1:
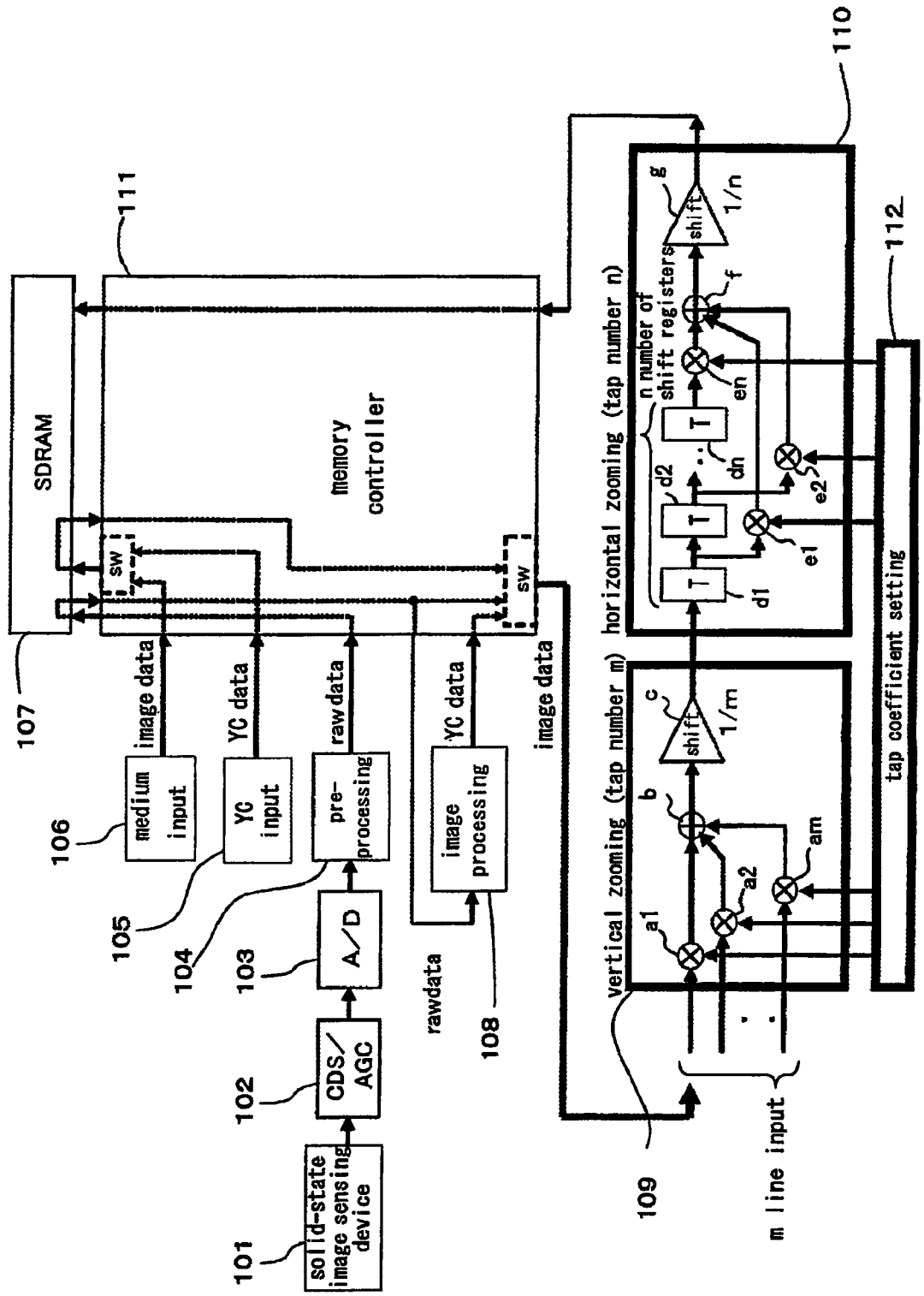
FIG. 1 is a block diagram illustrating a constitution of an electronic zooming device according to a preferred embodiment of the present invention.

Hereinafter, preferred embodiments of an electronic zooming device according to the present invention are described referring to the drawings. FIG. 1 shows a circuit configuration of an electronic zooming device according to a preferred embodiment of the present invention. Referring to reference numerals shown in the drawing, 101 denotes a solid-state image sensing device, 102 denotes a CDS/AGC (correlation double sampling/automatic gain control) circuit, 103 denotes an A/D (analog/digital) converter, 104 denotes a pre-processor, 105 denotes a YC (luminance/color-difference signal) input unit, 106 denotes a medium input unit, 107 denotes a SDRAM (synchronous DRAM), which constitutes a memory, 108 denotes an image processor, 109 denotes a vertical zooming unit, 110 denotes a horizontal zooming unit, 111 denotes a memory controller, and 112 denotes a tap coefficient setting unit.

The solid-state image sensing device 101 photoelectrically converts an optical image of a photographic subject and outputs charge information. The CDS/AGC circuit 102, which is a signal processor in charge of noise elimination and amplification, retrieves a charge signal obtained in the solid-state image sensing device 101 as an analog image signal. The A/D converter 103, which is a signal processor for converting the analog image signal into a digital image signal, converts the analog image signal retrieved by the CDS/AGC circuit 102 into digital raw data. The pre-processor 104 executes pre-processing such as black-level correction, gamma correction and gain correction to the digital raw data obtained by the A/D converter 103. The YC input unit 105 receives a YC signal inputted from an external video signal processing device. The medium input unit 106 receives digital image data inputted from an externally-attached medium. The SDRAM 107 stores the respective image data obtained via the pre-processor 104, image processor 108, YC input unit 105, medium input unit 106 and horizontal zooming unit 110. The image processor 108 generates YC data from the digital raw data pre-processed by the pre-processor 104. The vertical zooming unit 109 is a vertical zooming unit whose tap number is m, and comprises m number of multipliers a1-am, a summer b, and a shift register c. To the respective in number of multipliers a1-am are simultaneously inputted the digital image data for m number of vertical lines from the image processor 308 or the SDRAM 107 when a switch SW is turned on and off.

The m number of multipliers a1-am multiply the respective in number of digital image data by the tap coefficients set in the tap coefficient setting unit 112. The summer b sums up the m number of products. The shift register c executes a 1/m computing processing to the sum. As a result, the m number of digital images are sequentially resized in the vertical direction of the respective data.

The horizontal zooming unit 110, which is a horizontal zooming unit whose tap number is n, comprises n number of shift registers d1-dn vertically connected to one another, n number of multipliers e1-en, a summer f, and a shift register g. The horizontal zooming unit 110 sequentially inputs the vertically zoomed digital image data obtained in the vertical zooming unit 109 to the n number of shift registers d1-dn vertically connected to one another. Thereby, the multipliers e1-en multiply the outputs of the shift registers c1-cn by the tap coefficients set in the tap coefficient setting unit 112. The summer f sums up the n number of products. Further, the shift register g executes a 1/n-fold processing to the sum. As a result, the vertically zoomed digital image data is sequentially resized in the horizontal direction of the respective data.

The memory controller 111 controls the input and output of the data. The memory controller 111 controls the input and output of the data in the SDRAM 107 and a section where the digital image data is communicated with the SDRAM 107. Examples of the section where the digital image data is communicated with the SDRAM 107 are the pre-processor 104, image processor 108, YC input unit 105, medium input unit 106, vertical zooming unit 109 and horizontal zooming unit 110.

The tap coefficient setting unit 112 arbitrarily sets the m number of tap coefficients separately inputted to the multipliers a1-am of the vertical zooming unit 109 and the n number of tap coefficients separately inputted to the multipliers e1-en of the horizontal zooming unit 110.

Next, the operation of the electronic zooming device according to the present invention is described. The solid-state image sensing device 101 converts the optical image of the photographic subject into the charge information. The CDS/AGC circuit 102 retrieves the charge information as the analog image signal. The A/D converter 103 converts the retrieved analog image signal into the digital raw data. The pre-processor 104 pre-processes the output of the digital raw data. The pre-processed raw data (hereinafter, referred to as the pre-processed raw data) is temporarily stored in the SDRAM 107 via the memory controller 111. The memory controller 111 transmits the pre-processed raw data stored in the SDRAM 107 to the image processor 108. The image processor 108 converts the pre-processed raw data into the YC digital image data. The following is a constitution for obtaining the digital image data in a system different from the imaging process of the photographic subject. The digital image data inputted from outside is received via the YC input unit 105 or the medium input unit 106, and the digital image data thus received is temporarily stored in the SDRAM 107 via the memory controller 111.

Next, the image data obtained in the image processor 108, YC input unit 105 or medium input unit 106 is simultaneously inputted to the multipliers a1-am of the vertical zooming unit 109 by m lines via the memory controller 111. At the time, the arbitrary tap coefficients appropriate to the tap number m (m is an integer of at least two) in the vertical direction in the vertical zooming unit 109 are supplied to the multipliers a1-am by the tap coefficient setting unit 112. The respective multipliers a1-am multiply the supplied image data by the supplied tap coefficients, and outputs the respective products to the summer b. The summer b sums up (totals) the respective products and outputs the sum to the shift register c. The shift register c vertically resizes the digital image data by executing a 1/m-fold processing to the sum. The vertically resized digital image data thus obtained is inputted to the horizontal zooming unit 110.

When the vertically resized digital image data is inputted to the horizontal zooming unit 110, first, the shift registers d1-dn sequentially output the vertically resized digital image data to the respective multipliers e1-en. The respective multipliers e1-en multiply the outputs of the respective shift registers d1-dn by the arbitrary tap coefficients supplied from the tap coefficient setting unit 112, and output the multiplication results to the summer f. The summer f sums up (totals) the products of the respective multipliers e1-en and outputs the sum to the shift register g. The shift register g executes the 1/n-fold processing to the sum to thereby horizontally resize the digital image data. The horizontally zoomed digital image data thus obtained is stored to the SDRAM 107 via the memory controller 111.

In the description of the operation referring to FIG. 1, the tap coefficient setting unit 112 can set the respective tap coefficients of the vertical tap number m and the horizontal tap number n in accordance with the resizing magnifications used by the vertical zooming unit 109 and the horizontal zooming unit 110.

In the description of the operation referring to FIG. 1, it is assumed that the pre-processed raw data is stored in the SDRAM 107 according to the RGB Bayer array. When the pre-processed raw data of the SDRAM 107 is inputted to the vertical zooming unit 109 via the memory controller 111 in this case:

the tap coefficient setting unit 112 sets a real number to an odd-numbered coefficient from an end of the respective tap coefficients and sets zero to an even-numbered coefficient in the vertical tap number m; and the vertical zooming unit 109 sets a size for scale-down resizing to $1/(2m+1)$.

Further, when the vertically resized image data obtained in the vertical zooming unit 109 is inputted to the horizontal zooming unit 110;

the tap coefficient setting unit 112 sets a real number to an odd-numbered coefficient from an end of the respective tap coefficients and sets zero to an even-numbered coefficient in the horizontal tap number n; and the horizontal zooming unit 111 sets a size for scale-down resizing to $1/(2n+1)$.

According to the foregoing settings, the reduced image data can be obtained while the RGB Bayer array thereof is maintained. Provided that m=n=5 in the foregoing settings, the pixel data mixing in the RGB Bayer array can be realized in such a manner that nine pixels are mixed by the vertical and horizontal zooming processes.

When the following settings are adopted in the description of the operation referring to FIG. 1:

the vertical zooming unit 109 sets the resizing magnification to one fold (no resizing);

the tap coefficient setting unit 112 sets arbitrary tap coefficients in the vertical tap number m;

the horizontal zooming unit 110 sets the resizing magnification to one fold (no resizing); and the tap coefficient setting unit 112 sets arbitrary tap coefficients in the horizontal tap number n, the zoomed data can be obtained in such a manner that the original image data has been subjected to the arbitrary two-dimensional filtering image processing in the horizontal and vertical directions.

When the following settings are adopted in the description of the operation referring to FIG. 1:

each area data of the original image data for one screen which was finely divided is inputted to the vertical zooming unit 109;

the vertical zooming unit 109 sets the resizing magnification to one fold (no resizing);

the tap coefficient setting unit 112 sets an arbitrary tap coefficient to each of the areas in the vertical tap number m;

the vertically resized image data of each area obtained in the vertical zooming unit 109 is inputted to the horizontal zooming unit 110;

the horizontal zooming unit 110 sets the resizing magnification to one fold (no resizing); and the tap coefficient setting unit 112 sets an arbitrary tap coefficient to each of the areas in the horizontal tap number n, the zoomed data can be obtained in such a manner that the original image data has been subjected to the arbitrary two-dimensional filtering image processing in the horizontal and vertical directions independently by each of area data, and the obtained zoomed data can be written back into an area of the inputted image.

In the description of the operation referring to FIG. 1, when the custom filtering process is implemented to the same data of the original image a plurality of times, the bracket-processed data can be obtained in such a manner that the image quality of the same data in the original image has been adjusted the plurality of times.

In the description of the operation referring to FIG. 1, when the custom filtering process is separately implemented to each image of a plurality of original image data, the data in which the image quality has been adjusted can be obtained separately by each of the plurality of original image data.

Figure 2:
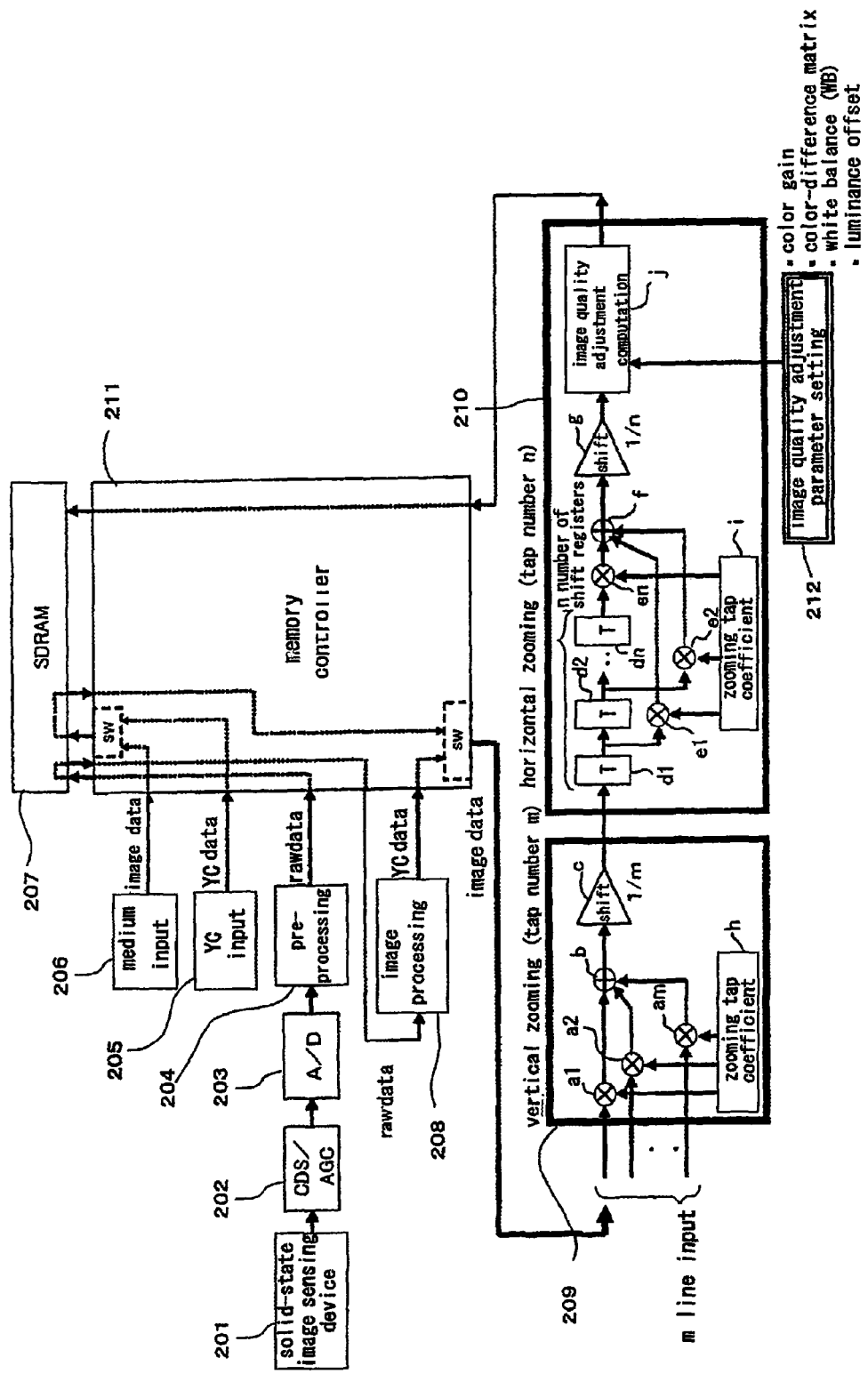
FIG. 2 is a block diagram illustrating a constitution of an electronic zooming device according to another preferred embodiment of the present invention.

FIG. 2 shows another preferred embodiment of the present invention. Referring to reference numerals shown in FIG. 2, 201 denotes a solid-state image sensing device, 202 denotes a CDS/AGC circuit, 203 denotes an A/D converter, 204 denotes a pre-processor, 205 denote a YC input unit, 206 denotes a medium input unit, 207 denotes an SDRAM, 208 denotes an image processor, 209 denotes a vertical zooming unit, 210 denotes a horizontal zooming unit, 211 denotes a memory controller, and 212 denotes an image quality adjustment parameter setting unit.

In the present preferred embodiment, a zooming tap coefficient setting section h is provided in the vertical zooming unit 209, wherein the digital image data for each of m lines is multiplied in the zooming tap coefficient setting section h and the multipliers a1-am, and the products are summed up by the summer b and subjected to the 1/m-fold processing in the shift register c, so that the image data is vertically resized.

Further, in the present preferred embodiment, a zooming tap coefficient setting section i and an image quality adjustment computing section j may be provided in the horizontal zooming unit 210. In that case, the vertically zoomed digital image data obtained in the vertical zooming unit 109 is sequentially inputted to the n number of shift registers d1-dn vertically connected to one another, and the outputs of the shift registers c1-cn are multiplied in the multipliers e1-en. At the time, the multipliers e1-en multiply the outputs of the shift registers c1-cn by the zooming tap coefficients supplied by the zooming tap coefficient setting section i. The summer f sums up (totals) the n number of products of the multipliers e1-en. The shift register g executes the 1/n-fold processing to the sum outputted by the summer f to thereby horizontally resize the digital image data. The image quality adjustment computing section j adjusts the image quality of the digital image data vertically and horizontally resized.

Further, in the present preferred embodiment, the image quality adjustment parameter setting unit 212 is provided, and the image quality adjustment computing section j adjusts the image quality based on an quality adjustment parameter supplied from the image quality adjustment parameter setting unit 212. The image quality adjustment parameter setting unit 212 sets arbitrary parameter values for adjusting the image quality of the resized data in the horizontal zooming unit 110.

In the present preferred embodiment, the image quality adjustment computing section j adjusts the image quality of the image data horizontally and vertically resized based on the arbitrary parameter values set by the image quality adjustment parameter setting unit 212 for adjusting the image quality of the image data vertically and horizontally resized, so that the data in which the image quality has been adjusted can be obtained. Examples of the parameter values recited in this description are a color gain set value for adjusting a gain of color data, a color-difference matrix set value for adjusting colors of color-difference data, a WB gain set value for adjusting a white balance (WB) gain of color data, and a luminance offset set value for adjusting an offset addition value of luminance data.

When the image quality adjustment parameter setting unit 212 repeatedly sets and outputs the arbitrary parameter values for adjusting the image quality of the image data horizontally and vertically resized, a plurality of bracket-processed data can be obtained in such a manner that the image quality of the same data in the original image data has been adjusted based on the various image quality parameters.

Further, each of the plurality of original image data is vertically resized in the vertical zooming unit 209 and horizontally resized in the horizontal zooming unit 210, and the image quality adjustment parameter setting unit 212 sets the arbitrary parameter values for adjusting the image quality in the vertically and horizontally resized data for each of the images. As a result, the plurality of original image data (more specifically, vertically and horizontally resized data) can be separately and independently converted into the data in which the image quality has been adjusted.

Figure 3:
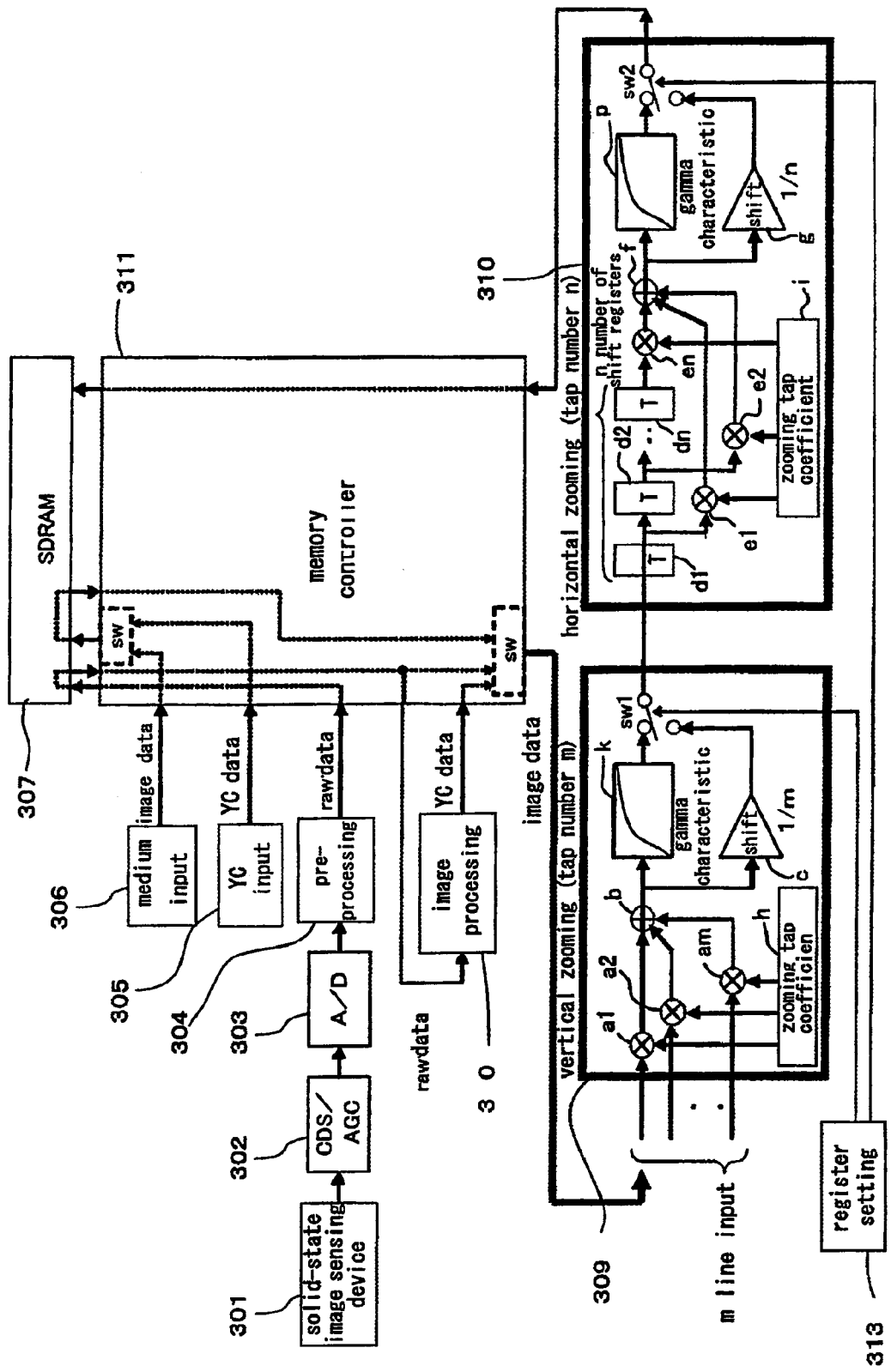
FIG. 3 is a block diagram illustrating a constitution of an electronic zooming device according to still another preferred embodiment of the present invention.

FIG. 3 shows still another preferred embodiment of the present invention. Referring to reference numerals shown in FIG. 3, 301 denotes a solid-state image sensing device, 302 denotes a CDS/AGC circuit, 303 denotes an A/D converter, 304 denotes a pre-processor, 305 denote a YC input unit, 306 denotes a medium input unit, 307 denotes a SDRAM, 308 denotes an image processor, 309 denotes a vertical zooming unit, 310 denotes a horizontal zooming unit, 311 denotes a memory controller, 312 denotes a gamma characteristic setting unit, and 313 denotes a register setting unit.

The gamma characteristic setting unit 312 supplies an arbitrary gamma characteristic for improving a sensitivity of low-luminance data to the data vertically resized by the vertical resizing unit 309 or horizontally resized by the horizontal zooming unit 310. The register setting unit 313 selects if the function of the gamma characteristic setting unit 312 is used or not used. The gamma characteristic setting unit 312 improves the sensitivity of the low-luminance data in the resizing process operated by the vertical zooming unit 309 or the horizontal zooming unit 310.

In the present preferred embodiment, a zooming tap coefficient setting section h is provided in the vertical zooming unit 209, wherein the digital image data for each of m lines is multiplied in the zooming tap coefficient setting section h and the multipliers a1-am, and the products are summed up by the summer b and the sum is subjected to the 1/m-fold processing in the shift register c. As a result, the image data is vertically resized. The sum in the summer b is subjected to the gamma correction in the gamma characteristic setting unit k, and the resultant is outputted after being switched via a switch SW in response to the output of the register setting unit 313.

Further, in the present preferred embodiment, a zooming tap coefficient setting section i and an image quality adjustment computing section j are provided in the horizontal zooming unit 210. Therefore, the vertically zoomed digital image data obtained in the vertical zooming unit 109 is sequentially inputted to the n number of shift registers d1-dn vertically connected to the vertical zooming unit 109, and the outputs of the shift registers c1-cn are multiplied by the zooming tap coefficients (set by the zooming tap coefficient setting section i) in the multipliers e1-en. The summer f sums up (totals) the n number of products of the multipliers e1-en. The shift register g executes the 1/n-fold processing to the sum outputted by the summer f to thereby horizontally resize the digital image data. On the other hand, the sum is subjected to the gamma correction in the gamma characteristic setting unit p, and the resultant is outputted after being switched via a switch SW2 in response to the output of the register setting unit 313.

As thus described, in the present preferred embodiment, the vertical zooming unit 309 executes the filter addition processing to the vertically resited data in accordance with the vertical tap number m to thereby generate the carried vertically resized data, the gamma characteristic setting unit k executes the arbitrary gamma correction to the carried vertically resized data to thereby generate the carried vertically resized and gamma-corrected data, the horizontal zooming unit 310 executes the filter addition processing to the carried vertically resized and gamma-corrected data in accordance with the horizontal tap number n to thereby generate the carried vertically and horizontally resized data, and the gamma characteristic setting unit p executes the arbitrary gamma correction to the carried vertically and horizontally resized data to thereby obtain the vertically and horizontally resized and gamma-corrected image data.

When the series of operations describe above are executed to the same original image data a plurality of times, the bracket-processed data obtained by executing the various gamma corrections to the same data of the original image a plurality of times can be realized. Further, when the series of operations described above are executed to a plurality of original image data, the various gamma-corrected image data can be obtained for each of the plurality of original image data.

In the electronic zooming devices according to the preferred embodiments thus described, being provided with the tap coefficient setting unit 112 capable of arbitrarily setting the tap coefficients (FIG. 1), the image quality parameter setting unit 212 capable of setting the arbitrary parameter values for adjusting the image quality of the resized data (FIG. 2), and the gamma characteristic setting units k and p for executing the gamma characteristic correction to the resized data (FIG. 3), any preferable filtering characteristic can be supplied to the original image data, in other words, the custom filtering function can be set, in the image resizing process without increasing a circuit size. As a result, the original image can be resized, and also subjected to the high-sensitivity image processing and the image quality adjustment in relation to the luminance signal and the color signal at the same time in the electronic zooming. In other words, these processings can be realized without any increase of processing time.

The preferred embodiments are effectively applied to an electronic zooming device capable of generating one image file in such a manner that a plurality of images obtained under different photographing conditions developed on the SDRAMs 107, 207, and 307 is scale-down resized, and then combined together after the image qualities thereof are adjusted.

Figure 4:
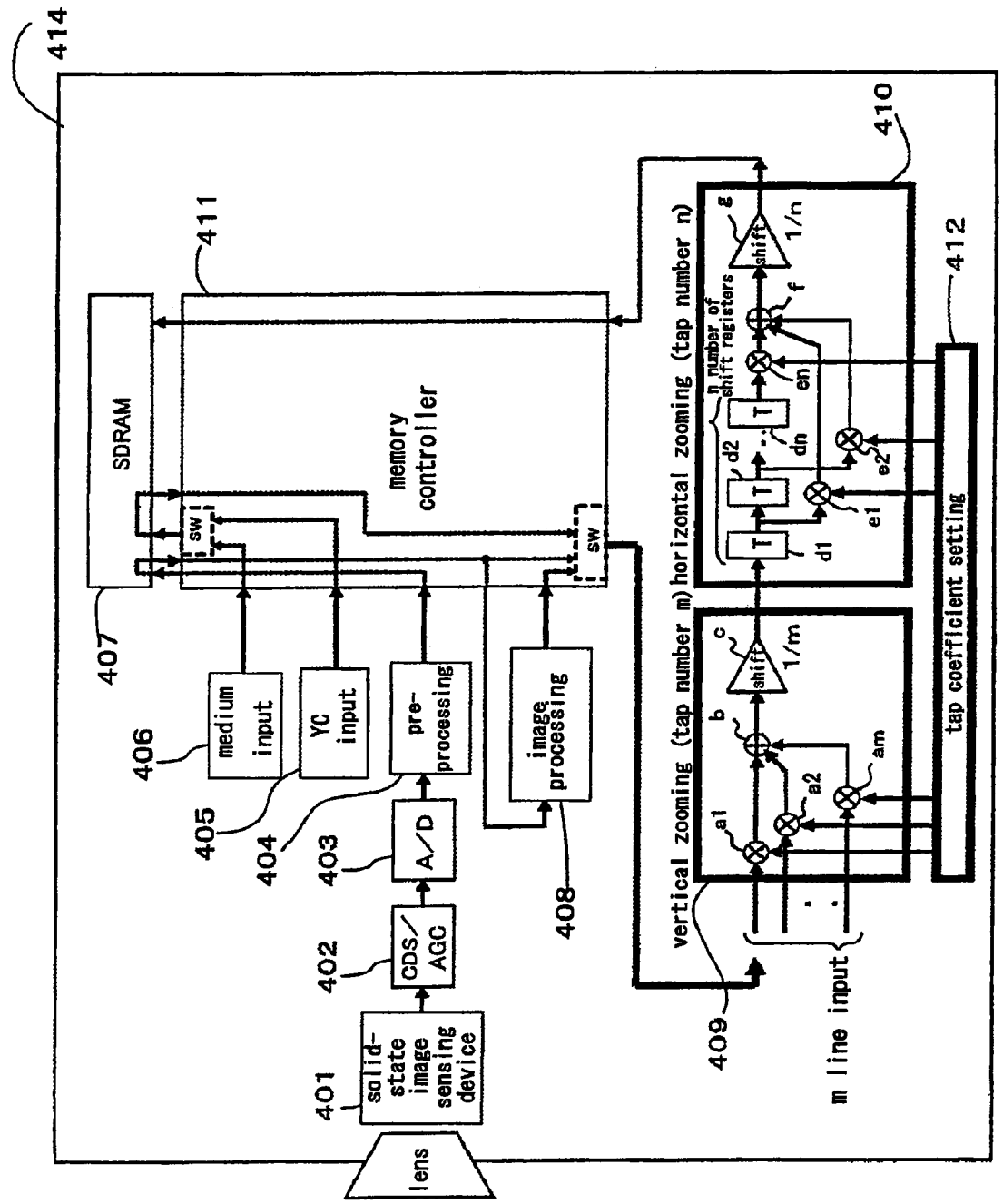
FIG. 4 is a block diagram showing an imaging device provided with an electronic zooming device according to the present invention.
Figure 5:
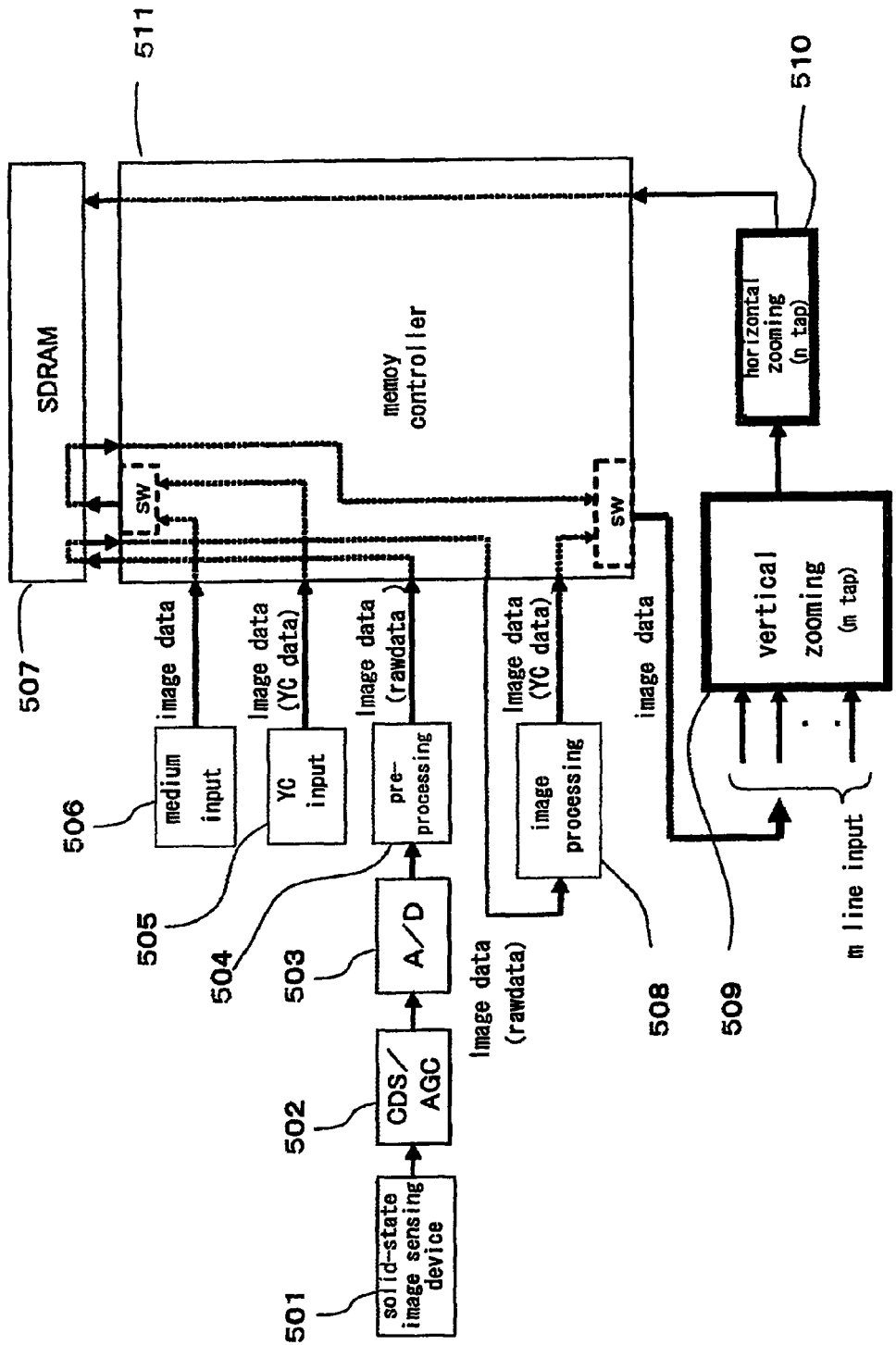
FIG. 5 is a block diagram illustrating a constitution of a conventional electronic zooming device.

FIG. 4 shows an imaging device 414 comprising the electronic zooming device according to the preferred embodiment 1. The electronic zooming device provided in the imaging device is not limited to the electronic zooming device according to the preferred embodiment 1, and any of the electronic zooming devices recited in the present invention can be applied thereto.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. An electronic zooming device comprising:
   a vertical zooming unit for vertically resizing image data by a tap number m;
   a horizontal zooming unit for horizontally resizing the vertically-resized image data outputted from the vertical zooming unit by a tap number n;
   a tap coefficient setting unit for arbitrarily setting respective tap coefficients when the vertical zooming unit or the horizontal zooming unit is operated;
   a memory in which the image data is stored; and
   a memory controller for controlling input and output of the image data among the memory, the vertical zooming unit and the horizontal zooming unit; and
   an image processor for correcting the image data when the vertical zooming unit or the horizontal zooming unit is operated,
   wherein image quality is adjusted in the horizontal zooming unit.

2. The electronic zooming device as claimed in claim 1, wherein the horizontal zooming unit further comprises:
   an image quality adjustment computing section for adjusting the image quality; and
   an image quality adjustment parameter setting section for setting an image quality adjustment parameter in the image quality adjustment computing section.

* * * * *